(12) United States Patent
Khosravi

(10) Patent No.: US 7,428,219 B2
(45) Date of Patent: Sep. 23, 2008

(54) SYSTEM AND METHOD TO EXCHANGE INFORMATION BETWEEN A CONTROL ELEMENT AND FORWARDING ELEMENTS IN A NETWORK ELEMENT ARCHITECTURE

(75) Inventor: Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 10/789,402

(22) Filed: Feb. 27, 2004

(65) Prior Publication Data

US 2005/0190783 A1 Sep. 1, 2005

(51) Int. Cl.
*H04L 12/28* (2006.01)
(52) U.S. Cl. ..................................... 370/254
(58) Field of Classification Search ................. 370/439
See application file for complete search history.

(56) References Cited

U.S. PATENT DOCUMENTS

| | | | |
|---|---|---|---|
| 6,345,288 B1 | 2/2002 | Reed et al. ................... 709/201 |
| 6,496,503 B1* | 12/2002 | Pelissier et al. ............. 370/389 |
| 6,785,272 B1* | 8/2004 | Sugihara ...................... 370/386 |
| 6,934,284 B1* | 8/2005 | Danielson et al. ............ 370/384 |
| 7,245,629 B1* | 7/2007 | Yip et al. ...................... 370/438 |
| 2002/0095454 A1 | 7/2002 | Reed et al. ................... 709/201 |
| 2002/0159463 A1* | 10/2002 | Wang .......................... 370/401 |
| 2002/0165973 A1* | 11/2002 | Ben-Yehezkel et al. ..... 709/230 |
| 2003/0169747 A1* | 9/2003 | Wang .......................... 370/400 |
| 2003/0185226 A1* | 10/2003 | Tang et al. ................... 370/428 |
| 2004/0083403 A1 | 4/2004 | Khosravi ...................... 714/13 |

* cited by examiner

*Primary Examiner*—Chau Nguyen
*Assistant Examiner*—Timothy J Weidner
(74) *Attorney, Agent, or Firm*—Daly, Crowley, Mofford & Durkee, LLP

(57) ABSTRACT

A network element comprises a control element (CE), a plurality of forwarding element (FEs) and an interconnect in communication with said CE and at least one of said FEs. Communication across the interconnect between the CE and the plurality of FEs is done in accordance with a protocol that includes a binding phase used to provide a data channel between the CE and a first one of the FEs. The binding phase is further used to provide a control channel between the CE and the first one of the FEs, the control channel used to transport control and configuration messages. The control channel is separate from the data channel. The protocol also includes a capability discovery phase, a configuration operation phase and an unbind phase executed between the CE and the FE.

21 Claims, 4 Drawing Sheets

SYSTEM AND METHOD TO EXCHANGE INFORMATION BETWEEN A CONTROL ELEMENT AND FORWARDING ELEMENTS IN A NETWORK ELEMENT ARCHITECTURE

CROSS REFERENCE TO RELATED APPLICATIONS

Not Applicable

STATEMENT REGARDING FEDERALLY SPONSORED RESEARCH

Not Applicable.

FIELD OF THE INVENTION

The present application relates generally to a network element architecture and, more particularly, to a mechanism for exchanging information between a control element and forwarding elements in the network element architecture.

BACKGROUND OF THE INVENTION

In recent years, a trend has emerged in the networking industry in which Internet Protocol (IP) network elements (NEs) have begun to evolve from highly customized and integrated designs to modular pieces of equipment. NEs appear to external entities as a monolithic piece of network equipment, such as a router, network address translator (NAT), firewall, or load balancer. Internally, however, the NE (such as a router) is composed of numerous logically separated entities that cooperate to provide a given functionality (such as routing).

Two types of network element components are commonly used in a NE: a control element (CE) and multiple forwarding elements (FEs). Control elements typically provide control functionality e.g., routing and signaling protocols. Forwarding elements typically handle data path operations for each packet.

There are several known mechanisms used for exchanging information between control elements and forwarding elements in NEs. Most of these mechanisms are FE and/or interconnect specific. Typically, the exchange of information between an FE and a CE occurs across a single channel carrying both control and configuration messages as well as data packets. Further, the messages tend to be large in size. The NE may also be susceptible to Denial of Service (DoS) attacks in which the network element is flooded with bogus control protocol packets, which saturate the channel established between the FE and the CE.

BRIEF DESCRIPTION OF THE DRAWINGS

The present mechanism for exchanging information between a control element and a set of forwarding elements will be more fully understood from the following detailed description taken in conjunction with the accompanying drawings, in which.

DETAILED DESCRIPTION OF THE INVENTION

Figure 1:
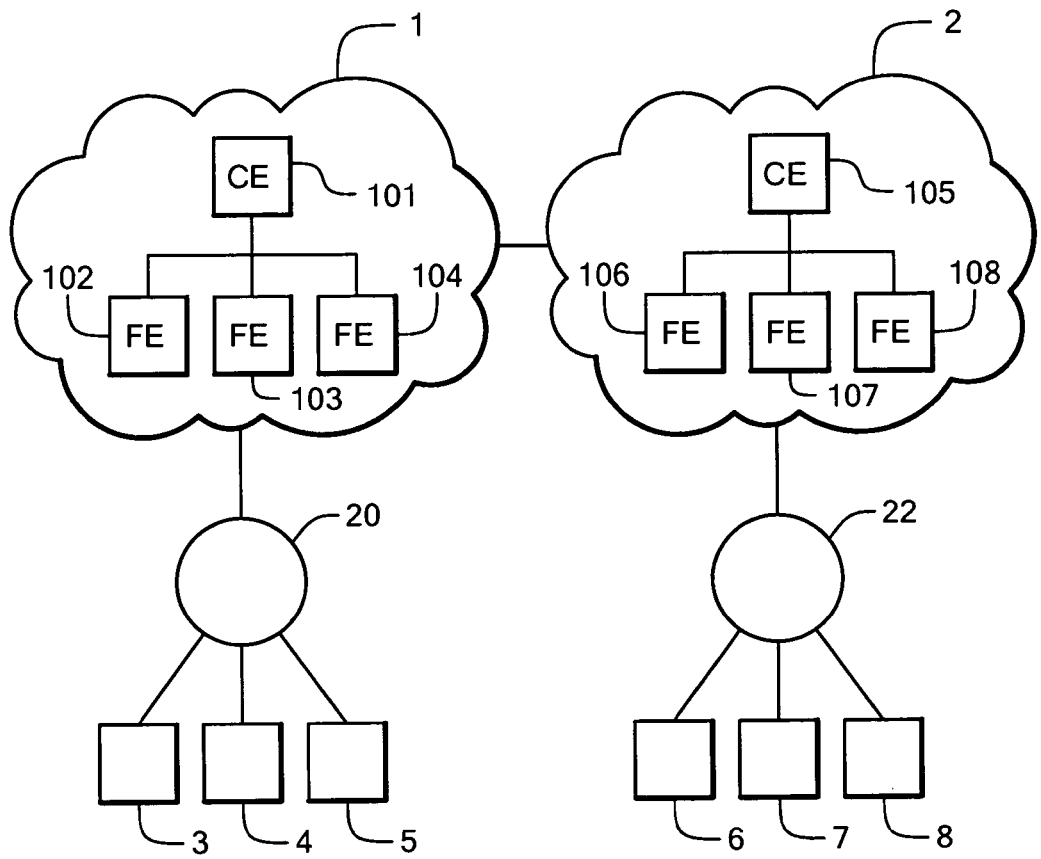
FIG. 1 comprises a block diagram of a network.

Before describing the present mechanism for exchanging information between a control element and a set of forwarding elements, some introductory concepts and terminology are explained.

A Forwarding Element, Control Element Separation (ForCES) protocol "ForCES Protocol" refers to the ForCES post-association phase protocol. The ForCES Post-Association Phase Protocol is a protocol used for post-association phase communication between CEs and FEs (defined below). The ForCES Protocol is a master-slave protocol in which the CEs are masters and the FEs are slaves. This protocol includes both the management of the communication channel (e.g., connection establishment, heartbeats) and the control messages themselves. This protocol could be a single protocol or could include multiple protocols working together, and may be unicast-based or multicast-based.

A forwarding element (FE), sometimes referred to as a forwarding plane, comprises a logical entity providing per-packet processing and handling as directed by a CE. Functions performed by the FE include LPM (longest prefix matching) packet forwarding, packet classifying, traffic shaping, metering, and network address translating. In one embodiment the FE implements the ForCES protocol.

A control element (CE), sometimes referred to as a control plane, comprises a logical entity instructing one or more FEs regarding how to process packets. CEs handle functionality such as the execution of control and signaling protocols. Some examples of control functions that can be implemented in the CE include routing protocols as well as control and signaling protocols. In one embodiment the CE implements the ForCES protocol.

The Network Processing Forum (NPF) Application Programming Interface (API), published August 2002, is a programming interface to control plane applications. The NPF API makes the existence of multiple forwarding planes as well as vendor-specific details transparent to the control plane applications. Thus, the protocol stacks and network processors available from different vendors can be easily integrated with the NPF APIs.

The Routing Information Protocol (RIP) comprises an interior gateway protocol that specifies how routers exchange routing table information. The Open Shortest Path First (OSPF) protocol is an interior gateway routing protocol developed for IP networks based on the shortest path first or link-state algorithm. Routers use link-state algorithms to send routing information to nodes in a network by calculating the shortest path to each node based on a topography of the network constructed by each node. Each router sends the portion of the routing table that describes the state of the router's own links.

Type-Length-Value (TLV) is a method of encoding parameters within a protocol message. TLV encoding typically includes one octet of type (T), one octet of length (L) and octets of value (V). The Type field indicates the type of items in the Value field. The Length field indicates the length of the Value field. The Value field comprises the payload portion of the packet.

Generic Routing Encapsulation (GRE) is an encapsulation protocol used for encapsulating packets inside a network layer protocol such as IP.

Referring now to FIG. 1, a block diagram of a network is shown. The network includes a first network router 1 coupled across a local area network (LAN) 20 to three systems 3, 4, and 5. The systems 3, 4, and 5 may be work stations, desktop computers, laptop computers or the like. The first router 1 is also coupled to a second router 2 which is coupled to three systems 6, 7, and 8 across LAN 22. First router 1 includes a control element 101 and multiple forwarding elements 102, 103, and 104. Second router includes a control element 105 and multiple forwarding elements 106, 107 and 108. With such an arrangement packets can be transferred from one system to another. For example, system 4 can transfer packets to system 8 by forwarding the packet to forwarding element 102 resident in first router 1. The control element 101 of first router 1 directs the packet received in forwarding element 102 to forwarding element 104. The packet is directed out of router 1 from forwarding element 104 to forwarding element 106 of second router 2. The control element 105 of second router 2 directs the packet from forwarding element 106 to forwarding element 108. The packet is then directed from forwarding element 108 to system 8.

Figure 2:
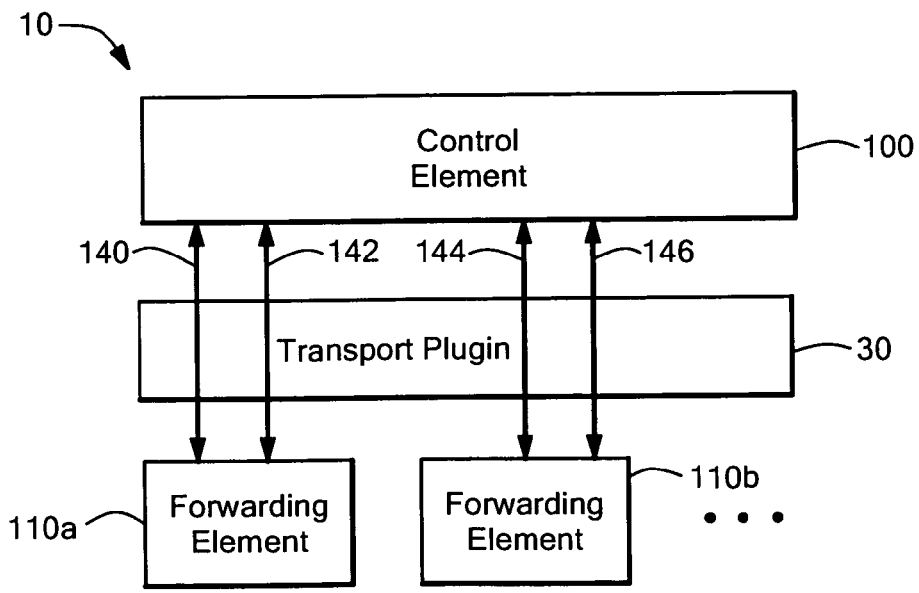
FIG. 2 comprises a block diagram of a network element architecture.

Referring now to FIG. 2, network element 10, such as a switch or a router, typically include a control element 100 and multiple forwarding elements 110a and 110b. The control element 100 controls and configures the forwarding elements 110a and 110b and the forwarding elements 110a and 110b manipulate the network traffic. In general, the control element 100 executes signaling and/or routing protocols (e.g. RIP, OSPF) and provides control information to the forwarding elements 110a and 110b. The forwarding elements 110a and 110b make decisions based on this information and perform operations on packets such as forwarding, classification, filtering, and the like.

The standardized Application Program Interfaces (APIs) within the control element 100 and forwarding elements 100a, 100b enable system vendors, Original Equipment Manufacturers (OEMs), and end users of network elements to mix and match components available from different vendors to achieve a device of their choice. The Network Processing Forum (NPF) API is an industry standard API for this purpose and provides a flexible and well-known programming interface to the control plane applications. The NPF API makes the existence of multiple forwarding elements, as well as vendor-specific details, transparent to the control element applications. Thus, the protocol stacks and network processors available from different vendors can be readily integrated with the NPF APIs.

In the illustrative embodiment, a NE includes a CE 100, a Transport Plugin 30 and FEs 110a and 110b. The CE 100 is used to provide the implementation for the NPF APIs described above. The CE 100 is aware of multiple FEs 110a and 110b and has the intelligence to perform one-to-many mapping of the FEs for the application. The transport plugin 30 facilitates communication between the CE and FEs and implements the transport protocol.

The presently described protocol provides a mechanism for exchanging information between the CE 100 and one or more FEs 110a, 110b in a network element architecture. In a particular embodiment the protocol is referred to as the FLEX (ForCES Light-weight Extensible) protocol. The FLEX protocol may form a part of the Transport Plugin 30.

The inventive protocol is a stateless, request-response protocol between the control element 100 and the forwarding elements 110a, 110b in an NE. The protocol is relatively lightweight in terms of both low message parsing overhead and utilization of small message sizes, which may be accomplished by using TLV or compact binary encapsulation for the message or packet payload. In one embodiment, the protocol has a fixed length header that is 8-bytes long followed by a variable length payload, with the messages being 32-bit aligned. An example packet header includes a version field, a flags field, a message type field and a command correlator field. The version field is one byte long and contains the version number of the protocol being used. The flags field is also one byte long and contains various flags that are used in protocol headers. The message type field is two bytes long and defines the message type (e.g., bind request, bind response, etc.). The command correlator field is four bytes long and is used to distinguish between commands of the same type. The command correlator field contains a sequence number for the command which is used in order to distinguish between the response to the commands of the same type. For example, a CE may issue a bind request to a first FE and a bind request to a second FE. The command correlator field assigns a different sequence number to each bind request such that the response to the first bind command can be distinguished from the response to the second bind request.

The inventive protocol is extensible by separating the data model from the base protocol. Thus, the message functionality is defined by the inventive protocol while the data within the message is defined by the data model. The inventive protocol provides the base functionality messages (e.g. configure request) while data that is included inside the messages (e.g. an IP forwarding table) is defined by the data model. Since the inventive protocol is separate from the data model, the inventive protocol is extensible and can carry different types of information. A separate FE model defines the data that needs to be exchanged or the payload for the inventive/base protocol.

The protocol implements separate control and data channels. Referring again to FIG. 2, the data channel 140, 144 carries control protocol packets, such as RIP or OSPF packets, which are either redirected from the FEs 110a, 110b to the CE 100 or are to be forwarded from the CE 100 to another FE. The control channel 142, 146 carries other control and configuration messages. The present protocol's separation of the control channel from the data channel allows the use of different transports for the control channel than those transports used in the data channel. The present protocol supports different interconnects by allowing different encapsulations for different interconnects. For example, when an IP interconnection is used, the inventive protocol uses TCP for the control channel. The present protocol meets ForCES requirements including command bundling, message priority, dynamic association and failover support.

The separation of the control and data channel helps make the present protocol robust against Denial of Service (DoS) attacks. In a DoS attack, a malicious user tries to bring down the system or network element by flooding the network element with bogus control protocol packets. If a single channel is used to carry both control messages from CE to FE as well as control protocol packets from FE to CE, the single channel would be overwhelmed by the bogus control protocol packets in case of a DoS attack. By separating information transferred between the CE 100 and the FEs 110a, 110b into two separate channels, the control channel can continue to work properly even when the data channel is overwhelmed during a DoS attack. Thus, the protocol is more robust against DoS attacks.

In one embodiment, the information exchange between the CE 100 and FE 110a, 110b using the present protocol includes multiple phases: a binding phase, a capability and topology discovery phase (also referred to as a capability discovery phase), and a configuration operation phase.

Figure 3:
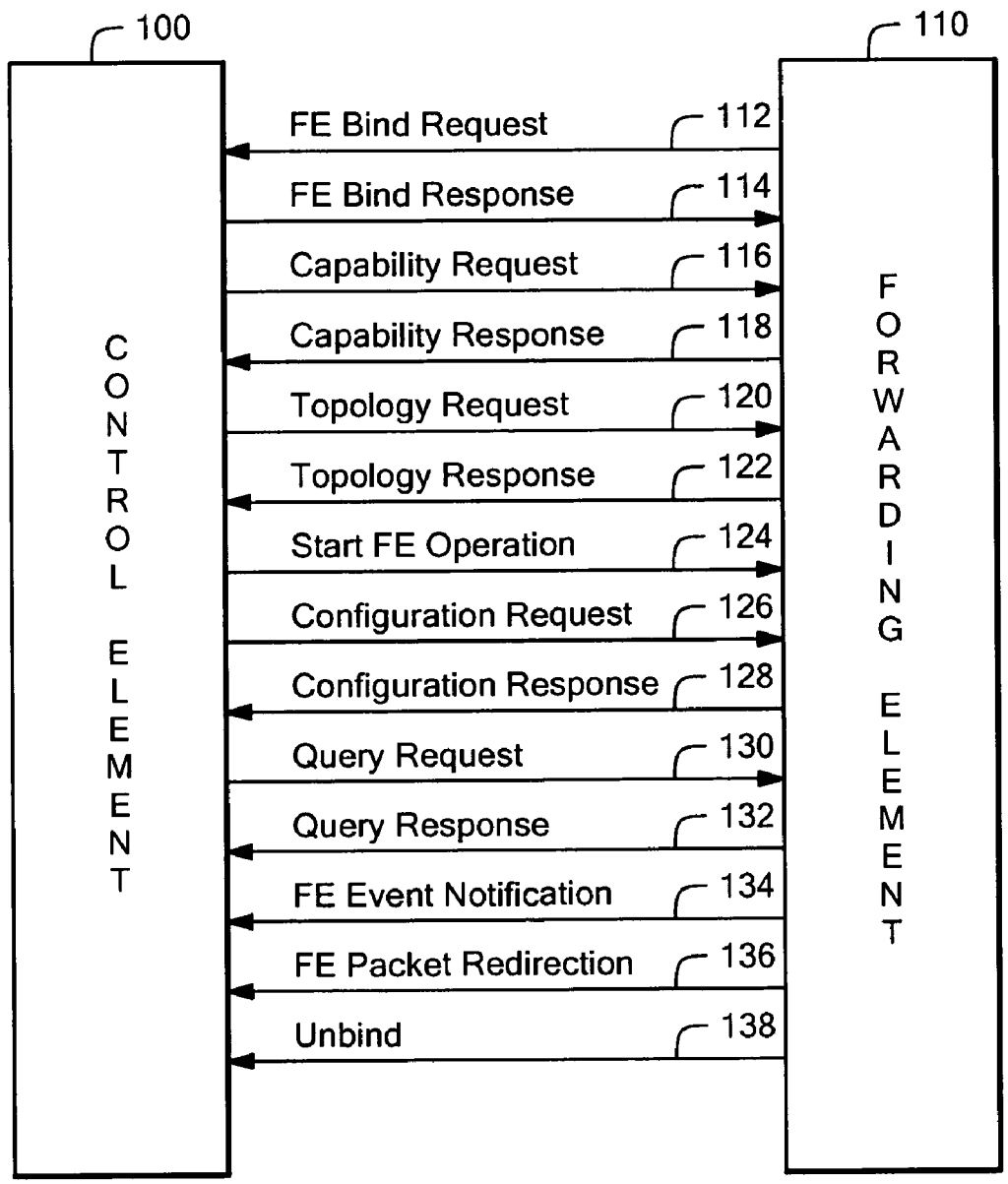
FIG. 3 comprises a block diagram of a control element and a forwarding element.

FIG. 3 shows an exemplary information exchange for these phases. In the binding phase, the FE 110 sends a bind request 112 to the CE 100. In response to receiving the bind request 112, the CE 100 sends back a bind response 114 to the FE. The bind response indicates whether the bind was successful or not. During this phase, encapsulation information is exchanged between the CE 100 and the FE 110, which leads to the provision of a separate data channel, such as a GRE tunnel, for the exchange of data packets between the CE 100 and the FE 110.

In the capability discovery phase, the CE 100 sends a capability request 116 to the FE 110. The FE 110, in response to receiving the capability request 116, sends back a capability response 118 with its capability information to the CE 100. For example, information such as the FE can perform IPv4 forwarding, 5-tuple packet classification, etc. The CE 100 also sends a topology request 120 to the FE 110. The FE 110 responds to the topology request 120 with a topology response 122 which includes the FE's topology information relative to other FEs. For example, information such as FE A is directly connected to FE B, C. If the CE 100 deems the FE's capabilities and topology acceptable and if the CE 100 is ready to control and configure the FE 110, the CE 100 sends a start FE operation message 124 to the FE 110. After the start FE operation message is received by the FE 110, the FE 110 can report events and send packets to the CE 100. A heartbeat message exchange also starts after the start FE operation message 124 is sent. The heartbeat is a periodic "pinging" of the CE and FE to ensure that they are still active. If the CE 100 is not capable of controlling or configuring the FE based on the FE's capabilities or topology, the CE 100 sends an unbind message 138 to the FE at this point.

In the configuration operation phase, a configuration request 126 is sent from the CE 100 to the FE 110. In response to receiving the configuration request 126, the FE 110 sends back a configuration response 128 to the CE 100. The configuration response 128 will indicate whether the configuration request 126 was successful or it failed for some reason. The CE 100 also sends a query request 130 to the FE 110. In response to receiving the query request 130, the FE 110 sends back a query response 132 to the CE 100. For example, the CE could send a query request 130 to query the status of a port on the FE 110 and the query response 132 would indicate the status of that port. Asynchronous FE events 134, such as port down events, are also reported to the CE 100. Packet redirection 136 between the CE 100 and the FE 110 also takes place i.e. control packets such as RIP, OSPF messages are redirected to the CE 100 from the FE 110 and vice-versa over the Data channel. Heartbeat messages are also exchanged between the CE 100 and FE 110 according to an interval set during the binding phase.

During the shutdown or unbinding phase, the FE 110 or the CE 100 send an unbind message 138 to the other which ends their association. In FIG. 3 the unbind message 138 is shown being sent from the FE 110 to the CE 100, although the CE 100 could have sent the unbind message 138 to the FE 110.

The information exchange between the CE and FEs can have several embodiments, which are FE or interconnect specific. The inventive protocol provides mechanisms for information exchange that provides reliability (using TCP/IP), robustness against DoS attacks (separation of control and data channel), extensibility (separation of protocol & data model) and low overhead/good performance (using TLV encoding).

Figure 4:
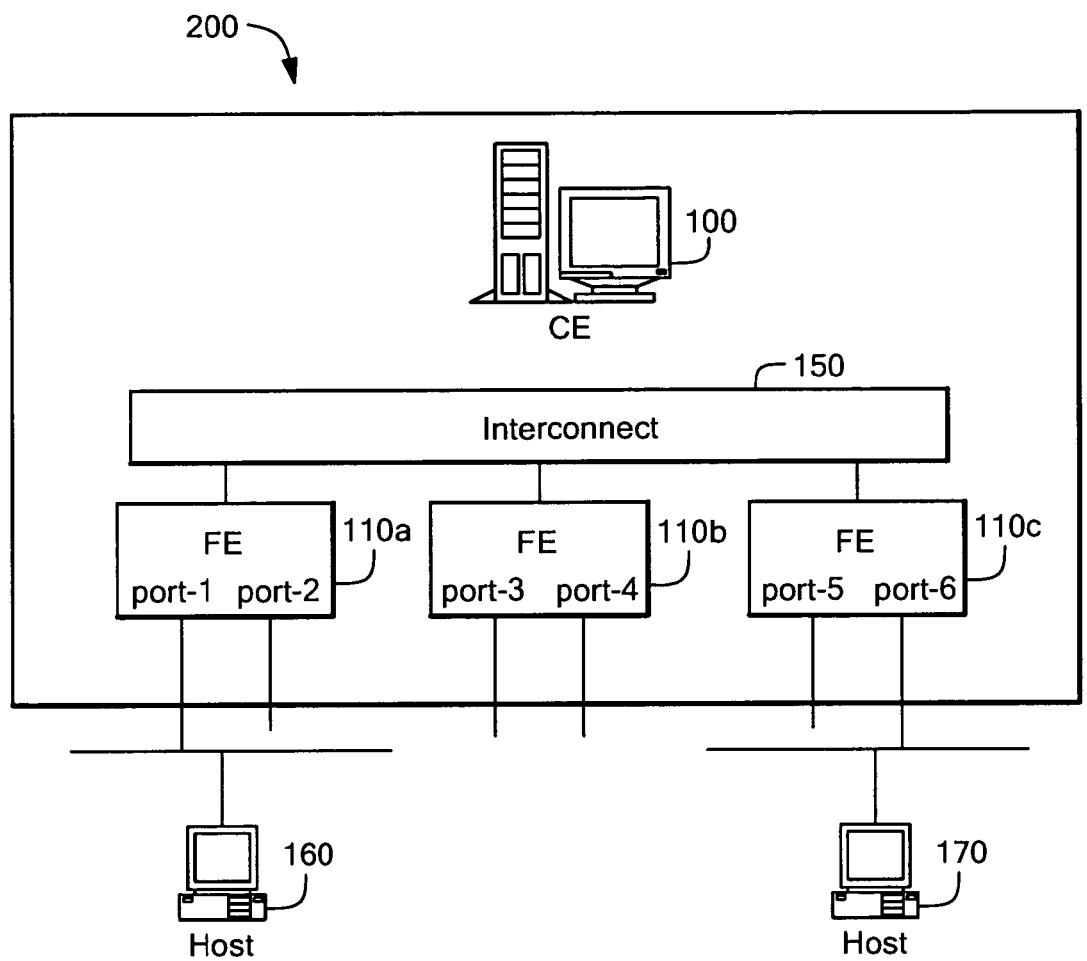
FIG. 4 comprises a block diagram of a router architecture.

Referring now to FIG. 4 an NE (in this example a router) 200 which implements the present protocol is shown. The NE 200 includes three FEs 110a, 110b and 110c as well as a CE 100 and an interconnect 150. In one embodiment the interconnect 150 is realized as a switch fabric. Host 160 sends a packet to FE 110a on port-1. The packet is forwarded from FE 110a to FE 110c. FE 110c receives the packet and forwards it over the egress port to host 170. In the NE 200, the present protocol is used to exchange information between the FEs 110a and 110c by way of CE 100.

The process starts with the CE 100 performing a bind operation with FE 110a, FE 110b and FE 110c. As a result of the bind operations a data channel is established between the FE 110a and CE 100, as is another data channel between CE 100 and FE 110c. A control channel is established between the FE 110a and the CE 100, as is another control channel between the CE 100 and the FE 110c. As described above, the capability discovery phase is executed as is the configuration operation phase. configuration request messages are used to download any configuration information from the CE 100 to the FEs 110a and 110c and the configuration response messages are used to notify the CE 100 about the result or status of the configuration requests.

Figure 5:
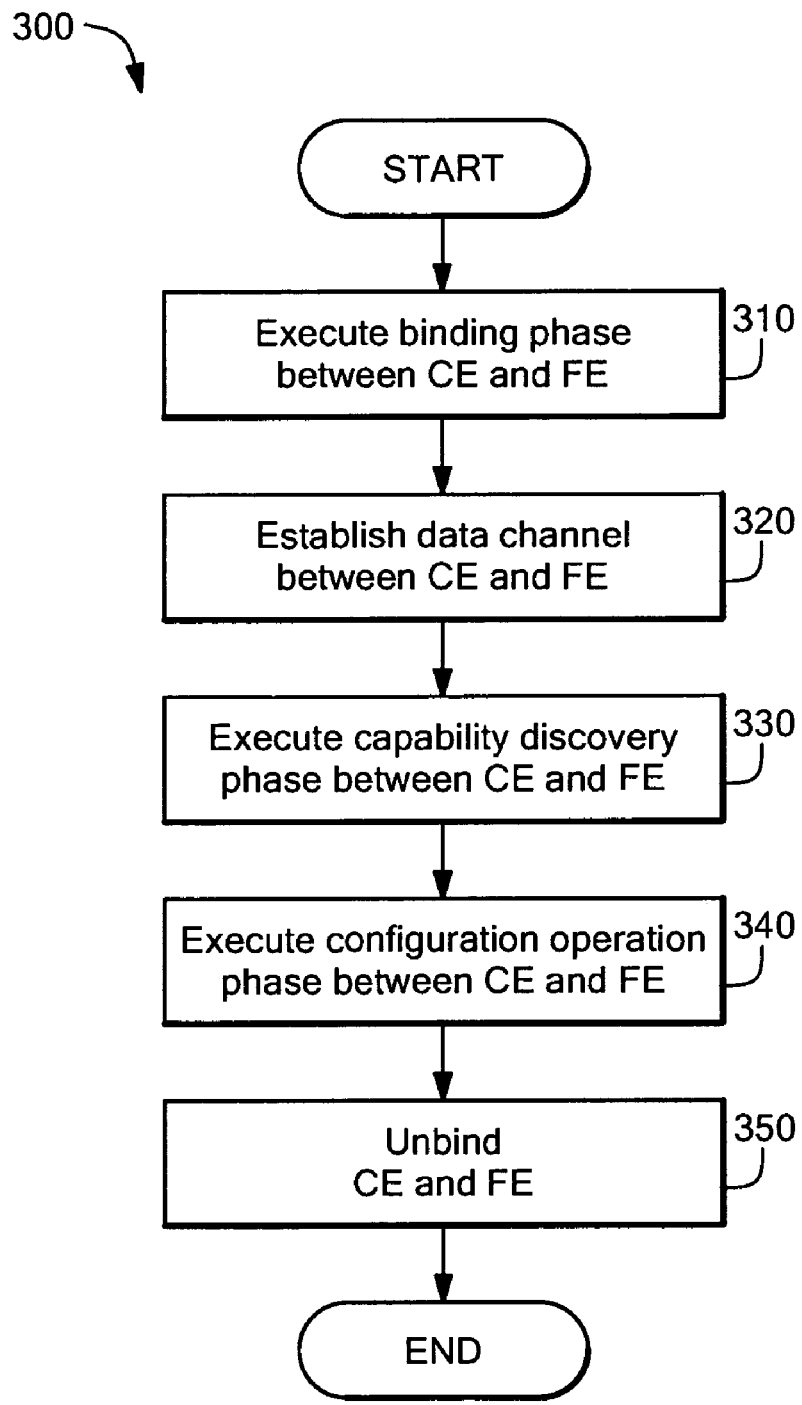
FIG. 5 comprises flow chart showing the implementation of a network element protocol.

A flow chart of the presently disclosed method is depicted in FIG. 5. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks can be performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present mechanism for exchanging information between a control element and a set of forwarding elements. It should be noted that many routine program elements, such as initialization of loops and variables and the use of temporary variables are not shown. It will be appreciated by those of ordinary skill in the art that unless otherwise indicated herein, the particular sequence of processing blocks and/or decision blocks described is illustrative only and can be varied without departing from the spirit of the mechanism for exchanging information between a control element and a set of forwarding elements. Thus, unless otherwise stated the processing blocks and/or decision blocks described below are unordered meaning that, when possible, the processing blocks and/or decision blocks can be performed in any convenient or desirable order.

Referring now to FIG. 5, the process starts and processing block 310 is executed. In processing block 310 a binding phase is performed between the FE and the CE. In the binding phase, the FE sends a bind request to the CE. In response to receiving the bind request, the CE sends back a bind response to the FE. This step also signifies the establishment of the control channel between the FE and the CE.

In processing block 320 a data channel is established between the CE and the FE. During the binding phase, encapsulation information is exchanged between the CE 100 and the FE 110, which enables the provision of a separate data channel for the exchange of data packets between the CE and the FE. The GRE protocol, for example, may be used for data channel formation.

In processing block 330 the capability discovery phase is executed wherein the CE sends a capability request to the FE. The FE, in response to receiving the capability request, sends back a capability response with its capability information to the CE. As part of the capability discovery phase the CE also sends a topology request to the FE. The FE responds to the topology request with a topology response which includes the FE's topology information relative to other FEs. If the CE deems the FE's capabilities and topology acceptable and if the CE is ready to control and configure the FE, the CE sends a Start FE Operation message to the FE. After the Start FE Operation message is received by the FE, the FE can report events and send packets to the CE.

Processing block 340 is performed next, wherein the configuration operation phase is performed. In this phase a configuration request is sent from the CE to the FE. In response to receiving the configuration request, the FE sends back a configuration response to the CE. The CE also sends a query request to the FE. In response to receiving the query request, the FE sends back a query response to the CE. Packet redirection between the CE and the FE also takes place over the data channel.

In processing block 350 an unbind of the CE and the FE takes place. The FE or the CE sends an unbind message to the other which ends their association. After the unbind, the process ends.

The present protocol provides a mechanism for exchanging information between the control element and one or more forwarding elements in a network architecture. Some of the features of this mechanism include extensibility (achieved by separation of the protocol and the data model), reliability (by using TCP/IP), improved performance (by using TLV encoding) and robustness against Denial of Service (DoS) attacks via separation of the Data and Control channel.

Having described preferred embodiments of the mechanism for exchanging information between a control element and a set of forwarding elements it will now become apparent to those of ordinary skill in the art that other embodiments incorporating these concepts may be used. Additionally, the software included as part of the mechanism for exchanging information between a control element and a set of forwarding elements may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the mechanism for exchanging information between a control element and a set of forwarding elements should not be limited to the described embodiments but rather should be limited only by the spirit and scope of the appended claims.

What is claimed is:

1. A method comprising:
exchanging information between a control element (CE) and one or more forwarding element (FEs), the exchanging comprising:
executing a binding phase between the CE and a first one of FEs to provide a data channel and a control channel separate from the data channel, the data channel configured to transport packets including at least one of redirected packets from the first one of the FEs to the CE and packets to be forwarded from the CE to a second one of the FEs, the control channel configured to transport control and configuration messages;
executing a capability discovery phase between the CE and the first one of the FEs, the capability discovery phase comprising:
transmitting a capability request from the CE to the first one of the FEs;
transmitting a topology request from the CE to the first one of the FEs; and
executing a configuration operation phase between the CE and the first one of the FEs,
wherein executing a binding phase further comprises:
transmitting a bind request, from the first one of the FEs to the CE, to establish the data channel and the control channel; and
transmitting a bind response, from the CE to the first one of the FEs after the first one of the FEs has received the bind request, the bind response indicating whether the data channel and the control channel are established.

2. The method of claim 1 wherein the exchanging further comprising executing an unbind phase between the CE and the first one of the FEs,
wherein the unbind phase includes one of the CE and the first one of the FEs sending an unbind message to the other to cease association.

3. The method of claim 1 wherein said executing a capability discovery phase comprises:
receiving a capability response from the first one of the FEs in response to the capability request;
receiving a topology response from the first one of the FEs in response to the topology request; and
determining whether to transmit a start FE operation message from the CE to the first one of the FEs based on the capability response and the topology response.

4. The method of claim 1 wherein said executing a configuration operation phase comprises:
transmitting a configuration request from the CE to the first one of the FEs; and
transmitting a query request from the CE to the first one of the FEs.

5. The method of claim 4 wherein said executing a configuration operation phase further comprises:
transmitting a configuration response from the first one of the FEs to the CE after the first one of the FEs has received said configuration request;
transmitting a query response from the first one of the FEs to the CE after the first one of the FEs has received said query request;
transmitting an FE event notification message from the first one of the FEs to the CE; and
transmitting an FE packet redirection message from the first one of the FEs to the CE.

6. The method of claim 1 wherein said messages are provided having an eight-byte header.

7. The method of claim 1 wherein said messages are provided having a variable length payload.

8. A network element module comprising:
a control element (CE);
a plurality of forwarding elements (FEs); and
an interconnect in communication with said CE and said plurality of FEs and wherein communication across said interconnect between the CE and the FE is accomplished by executing instructions causing a machine to:
execute a binding phase between the CE and a first one of the FEs to provide a data channel and a control channel separate from the data channel, the data channel configured to transport packets including at least one of redirected packets from the first one of the FEs to the CE and packets to be forwarded from the CE to a second one of the FEs, the control channel configured to transport control and configuration messages;
execute a capability discovery phase between the CE and the first one of the FEs, the capability discovery phase comprising:
transmitting a capability request from the CE to the first one of the FEs;

transmitting a topology request from the CE to the first one of the FEs; and
execute a configuration operation phase between the CE and the first one of the FEs,
wherein executing a binding phase further comprises;
transmitting a bind request, from the first one of the FEs to the CE, to establish the data channel and the control channel; and
transmitting a bind response from the CE to the first one of the FEs after the first one of the FEs has received the bind request, the bind response indicating whether the data channel and the control channel are established.

9. The network element module of claim 8 wherein said communication further comprises executing an unbinding phase between the CE and the first one of the FEs,
wherein the unbind phase includes one of the CE and the first one of the FEs sending an unbind message to the other to cease association.

10. The network element module of claim 8 wherein said capability discovery phase comprises:
receiving a capability response from the first one of the FEs in response to the capability request;
receiving a topology response from the first one of the FEs in response to the topology request; and
determining whether to transmit a start FE operation message sent from the CE to the first one of the FEs based on the capability response and the topology response.

11. The network element module of claim 8 wherein said configuration operation phase comprises:
a configuration request sent from the CE to the first one of the FEs; and
a query request sent from the CE to the first one of the FEs.

12. The network element module of claim 11 wherein said configuration operation phase further comprises:
a configuration response sent from the first one of the FEs to the CE after the first one of the FEs has received said configuration request;
a query response sent from the first one of the FEs to the CE after the first one of the FEs has received said query request;
an FE event notification message sent from the first one of the FEs to the CE; and
an FE Packet redirection message sent from the first one of the FEs to the CE.

13. The network element module of claim 8 wherein said messages are provided having an eight-byte header.

14. The network element module of claim 8 wherein said messages are provided having a variable length payload.

15. An article comprising:
a storage medium having stored thereon instructions causing a machine to:
execute a binding phase between the CE and a first one of the FEs to provide a data channel and a control channel separate from the data channel, the data channel configured to transport packets including at least one of redirected packets from the first one of the FEs to the CE and packets to be forwarded from the CE to a second one of the FEs, the control channel configured to transport control and configuration messages;
execute a capability discovery phase between the CE and the first one of the FEs, the capability discovery phase comprising:
transmitting a capability request from the CE to the first one of the FEs;
transmitting a topology request from the CE to the first one of the FEs;
execute a configuration operation phase between the CE and the first one of the FEs,
wherein executing a binding phase further comprises:
transmitting a bind request, from the first one of the FEs to the CE, to establish the data channel and the control channel; and
transmitting a bind response from the CE to the first one of the FEs after the first one of the FEs has received said bind request, the bind response indicating whether the data channel and the control channel are established.

16. The article of claim 15, further comprising instructions causing a machine to execute an unbind phase between the CE and the first one of the FEs,
wherein the unbind phase includes one of the CE and the first one of the FEs sending an unbind message to the other to cease association.

17. The article of claim 15, further comprising instructions causing a machine to:
receive a capability response from the first one of the FEs in response to the capability request;
receive a topology response from the first one of the FEs in response to the topology request; and
determine whether to transmit a start FE operation message from the CE to the first one of the FEs based on the capability response and the topology response.

18. The article of claim 15, further comprising instructions causing a machine to:
execute at least one of transmit a configuration request from the CE to the first one of the FE; and
transmit a query request from the CE to the first one of the FEs.

19. The article of claim 18, further comprising instructions causing a machine to:
transmit a configuration response from the first one of the FEs to the CE after the first one of the FEs has received said configuration request;
transmit a query response from the first one of the FEs to the CE after the first one of the FEs has received said query request;
transmit an FE event notification message from the first one of the FEs to the CE; and
transmit an FE Packet redirection message from the first one of the FEs to the CE.

20. The article of claim 15, further comprising instructions causing a machine to provide said messages having an eight byte header.

21. The article of claim 15, further comprising instructions causing a machine to provide said messages having a variable length payload.

* * * * *

UNITED STATES PATENT AND TRADEMARK OFFICE
CERTIFICATE OF CORRECTION

PATENT NO.        : 7,428,219 B2                                         Page 1 of 1
APPLICATION NO.   : 10/789402
DATED             : September 23, 2008
INVENTOR(S)       : Khosravi It is certified that error appears in the above-identified patent and that said Letters Patent is hereby corrected as shown below:

In column 10, lines 35-39, in Claim 18, delete "causing a machine to:
execute at least one of transmit a configuration request from the CE to
the first one of the FE;
and
transmit a query request from the CE to the first one of the FEs." and
insert -- causing a machine to execute at least one of:
transmit a configuration request from the CE to the first one of the FEs; and
transmit a query request from the CE to the first one of the FEs. --, therefor.

Signed and Sealed this

Sixteenth Day of December, 2008

JON W. DUDAS
*Director of the United States Patent and Trademark Office*